(12) United States Patent
Inaba

(10) Patent No.: US 12,050,940 B2
(45) Date of Patent: Jul. 30, 2024

(54) DATA PROCESSING APPARATUS, DATA PROCESSING METHOD, AND COMPUTER READABLE MEDIUM

(71) Applicant: MITSUBISHI ELECTRIC CORPORATION, Tokyo (JP)

(72) Inventor: Takafumi Inaba, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/135,346

(22) Filed: Apr. 17, 2023

(65) Prior Publication Data

US 2023/0259372 A1 Aug. 17, 2023

Related U.S. Application Data

(63) Continuation of application No. PCT/JP2020/048558, filed on Dec. 24, 2020.

(51) Int. Cl.
   G06F 9/54 (2006.01)
   G06F 9/451 (2018.01)
   G06F 21/53 (2013.01)

(52) U.S. Cl.
   CPC .............. *G06F 9/541* (2013.01); *G06F 9/451* (2018.02); *G06F 21/53* (2013.01); *G05B 2219/34256* (2013.01); *G05B 2219/34282* (2013.01)

(58) Field of Classification Search
   CPC . G06F 9/451; G06F 9/541; G06F 8/36; G06F 11/36; G05B 2219/34256; G05B 2219/34282; G05B 19/401; G05B 19/4097

(Continued)

(56) References Cited

U.S. PATENT DOCUMENTS 8,838,430 B1* 9/2014 Lang ................. G06F 30/20
                                            703/22
10,437,712 B1* 10/2019 Tyler ............... G06F 11/3684
(Continued)

FOREIGN PATENT DOCUMENTS

JP           63-10254 A       1/1988
JP           7-295832 A      11/1995
(Continued)

OTHER PUBLICATIONS

International Search Report (PCT/ISA/210) issued in PCT/JP2020/048558 mailed on Mar. 30, 2021.

*Primary Examiner* — Patrick F Riegler
*Assistant Examiner* — Matthew J Ludwig
(74) *Attorney, Agent, or Firm* — Birch, Stewart, Kolasch & Birch, LLP

(57) ABSTRACT

An API classification unit (231) extracts as omittable internal data processing, from among internal data processing included in execution data processing which is data processing executed by an outside data processing device which is a data processing device outside, internal data processing that is required to be executed when the outside data processing device executes the execution data processing, but is omittable from the execution when a data processing apparatus (10) executes the execution data processing, due to a difference in an execution environment between the outside data processing device and the data processing apparatus (10). An execution unit (235) executes the execution data processing while omitting the execution of the omittable internal data processing extracted by the API classification unit (231).

6 Claims, 11 Drawing Sheets

(58) Field of Classification Search
USPC .......................................... 715/733; 719/328
See application file for complete search history.

(56) References Cited

U.S. PATENT DOCUMENTS

| | | | |
|---|---|---|---|
| 11,232,193 B1* | 1/2022 | Raber | ........................ G06F 9/54 |
| 11,704,431 B2* | 7/2023 | Kraus | ................. H04L 63/0414 |
| | | | 726/26 |
| 2001/0027387 A1 | 10/2001 | Miyake et al. | |
| 2011/0055680 A1* | 3/2011 | Williamson | ............ G06F 9/451 |
| | | | 715/781 |
| 2013/0338993 A1 | 12/2013 | Zhong et al. | |
| 2014/0282501 A1 | 9/2014 | Zeng et al. | |
| 2014/0282533 A1 | 9/2014 | Ito | |
| 2016/0283262 A1 | 9/2016 | Zeng et al. | |
| 2018/0173545 A1 | 6/2018 | Zhong et al. | |
| 2018/0343206 A1* | 11/2018 | White | ...................... H04L 47/11 |
| 2019/0180029 A1* | 6/2019 | Copty | ....................... G06F 21/56 |
| 2020/0004571 A1* | 1/2020 | Piwonka | .............. G06F 9/45558 |
| 2020/0310764 A1* | 10/2020 | Djaafri | ................ G06F 11/3664 |
| 2023/0145025 A1* | 5/2023 | Qureshi | ................ G06F 9/5094 |
| | | | 718/100 |

FOREIGN PATENT DOCUMENTS

| | | | |
|---|---|---|---|
| JP | 2002-244883 A | 8/2002 | |
| JP | 2005-321848 A | 11/2005 | |
| JP | 2014-174863 A | 9/2014 | |
| JP | 2014-235578 A | 12/2014 | |
| JP | 2015-511041 A | 4/2015 | |
| JP | 2016-617572 A | 6/2016 | |

* cited by examiner

Fig. 7

| CLASSIFICATION LIST |
|---|
| from |
| nc |
| : (OMISSION) |
| sys |
| .. |

DATA PROCESSING APPARATUS, DATA PROCESSING METHOD, AND COMPUTER READABLE MEDIUM

CROSS REFERENCE TO RELATED APPLICATIONS

This application is a Continuation of PCT International Application No. PCT/JP2020/048558, filed on Dec. 24, 2020, which is hereby expressly incorporated by reference into the present application.

TECHNICAL FIELD

The present disclosure relates to a technique where data processing executed by an outside data processing device is executed by a data processing apparatus whose execution environment differs from that of the outside data processing device.

BACKGROUND ART

A simulation function is provided in control software that supports machining performed by a machine tool which is used in a device such as a Computerized Numerical Control (CNC) device. The CNC device is a device that numerically controls by a computer, a position and/or an amount of movement of a tool of the machine tool. Further, the control software that supports machining performed by the machine tool is, for example, a Computer-Aided Design/Computer-Aided Manufacturing (CAD/CAM).

The simulation function makes it possible to check a machining result before machining is actually carried out with using the machine tool. Therefore, the simulation function makes it possible to check in advance as to whether or not to be able to obtain intended machining, whether or not to damage a tool and/or a machining object when operating the machining tool, or the like.

Therefore, the simulation function is required to simulate operation of the machine tool as precisely as possible. As a method of precisely simulating the operation of the machine tool, there is a method of using the control software that is actually installed in the CNC device. Specifically, a precise simulation can be obtained when operating the control software on a general-purpose Personal Computer (PC) with using an existing virtualization technique.

Patent Literature 1 migrates the control software in a form of an executable file (binary data) to the general-purpose PC. An execution environment of the control software greatly differs between the CNC device and the general-purpose PC. Here, the execution environment is a processor, other pieces of hardware, and a hardware environment and a software environment for executing data processing of an Operating System (OS) and the like.

In order to absorb such a difference in the execution environment, Patent Literature 1 requires hardware processing and OS processing to be converted with using the virtualization technique. This virtualization technique precisely simulates the hardware processing and the OS processing in the CNC device on the general-purpose PC.

CITATION LIST

Patent Literature

Patent Literature 1: JP 2015-511041 A

SUMMARY OF INVENTION

Technical Problem

As described above, in Patent Literature 1, the virtualization technique simulates the hardware processing and the OS processing in the CNC device on the general-purpose PC. On the other hand, in Patent Literature 1, there is a problem in that an execution speed of the simulation function decreases due to an overhead caused by the virtualization technique.

The present disclosure mainly aims to solve such a problem. Specifically, the present disclosure mainly aims to reduce an overhead caused from a difference in an execution environment.

Solution to Problem

A data processing apparatus whose execution environment for data processing differs from that of an outside data processing device which is a data processing device outside, and that executes execution data processing which is data processing executed by the outside data processing device, the data processing apparatus according to the present disclosure includes:

an extraction unit to extract as omittable internal data processing, from among internal data processing included in the execution data processing, internal data processing that is required to be executed when the outside data processing device executes the execution data processing, but is omittable from the execution when the data processing apparatus executes the execution data processing, due to the difference in the execution environment between the outside data processing device and the data processing apparatus; and an execution unit to execute the execution data processing while omitting the execution of the omittable internal data processing extracted by the extraction unit.

Advantageous Effects of Invention

According to the present disclosure, it is possible to reduce an overhead caused from a difference in an execution environment.

BRIEF DESCRIPTION OF DRAWINGS

FIG. 7 is a diagram illustrating a classification list according to the first embodiment.

DESCRIPTION OF EMBODIMENTS

Figure 1:
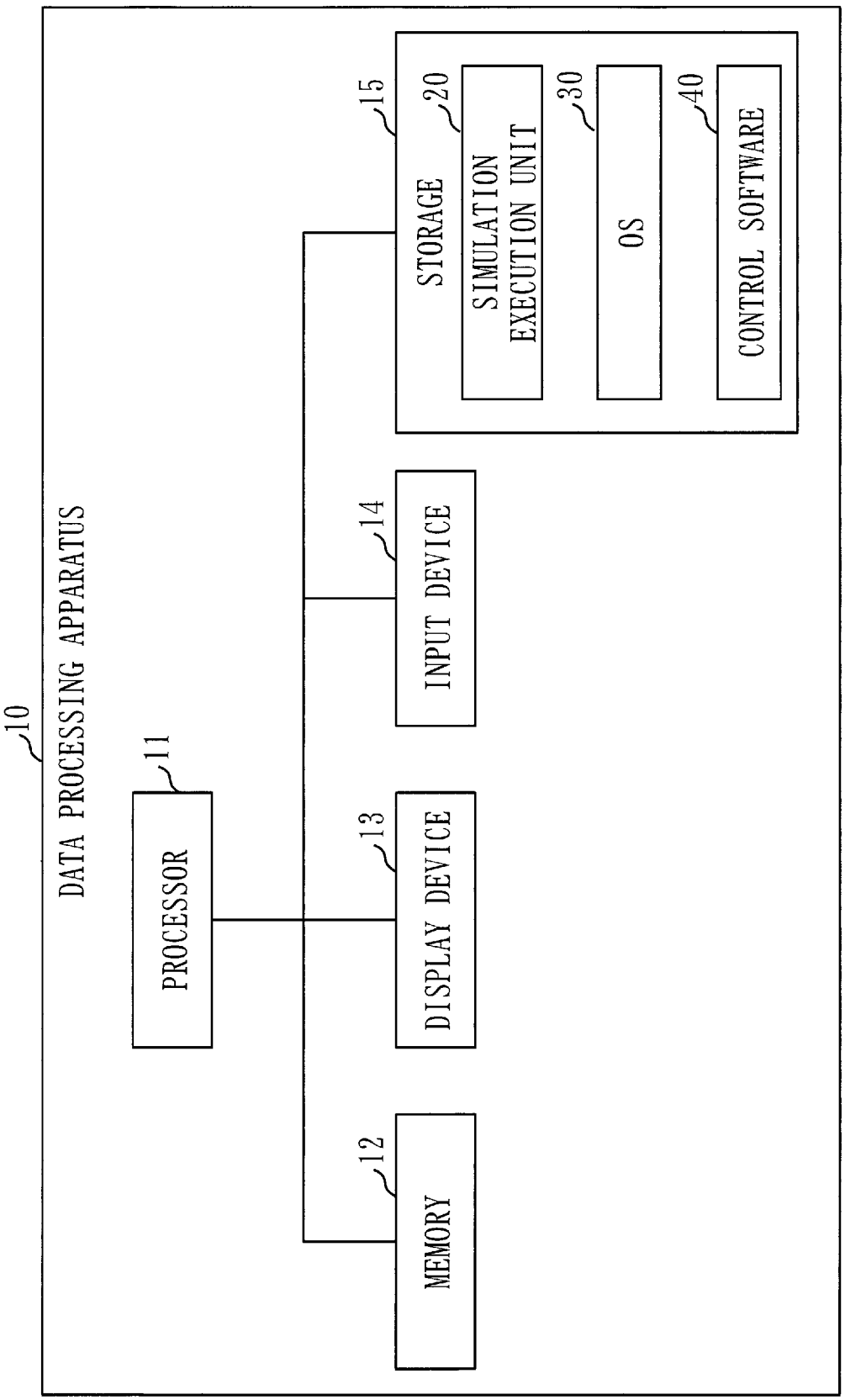
FIG. 1 is a diagram illustrating a hardware configuration example of a data processing apparatus according to a first embodiment.

Hereinafter, an embodiment will be described with reference to the drawings. In the following description of the embodiment and the drawings, parts assigned the same reference numerals indicate the same parts or corresponding parts.

First Embodiment

Description of Configuration

[Hardware Configuration Example]

FIG. 1 illustrates a hardware configuration example of a data processing apparatus 10 according to the present embodiment.

The data processing apparatus 10 differs in an execution environment for data processing, from an outside data processing device (not illustrated) which is a data processing device outside. The data processing apparatus 10 executes execution data processing which is data processing executed by the outside data processing device. As described above, the execution environment is a processor, other pieces of hardware, and a hardware environment and a software environment for executing data processing of an Operating System (OS) and the like.

An operation procedure of the data processing apparatus 10 is equivalent to a data processing method. Further, a program that implements operation of the data processing apparatus 10 is equivalent to a data processing program.

The data processing apparatus 10 is, for example, a general-purpose PC. In the present embodiment, an example will be described in which the data processing apparatus 10 which is the general-purpose PC, executes control software executed in a CNC device, for simulating a control of operation of a machine tool by the CNC device. In an example to be described in the present embodiment, the CNC device is equivalent to the outside data processing device. Further, the control software for controlling the machine tool is equivalent to the execution data processing.

As illustrated in FIG. 1, the data processing apparatus 10 includes a processor 11, a memory 12, a display device 13, an input device 14, and a storage 15, as pieces of hardware.

Among these pieces of hardware, at least the processor 11, the memory 12, and the storage 15 differs in performance, specifications, and the like, from those of a processor, a memory, and a storage of the CNC device. Further, hardware mounted in the CNC device, such as an interface with an amplifier, is not mounted in the data processing apparatus 10.

Further, the data processing apparatus 10 includes an OS 30, but the OS 30 differs in performance, specifications, and the like, from an OS of the CNC device. For example, the OS of the CNC device is a real-time OS, but the OS 30 of the data processing apparatus 10 is not a real-time OS.

Such differences in the hardware and the OS cause a difference in the execution environment between the data processing apparatus 10 and the CNC device.

Further, the data processing apparatus 10 includes a simulation execution unit 20 to be described below, as a functional configuration.

The storage 15 stores programs that implement functions of the simulation execution unit 20, the OS 30, and control software 40. The control software 40 is the control software executed in the CNC device. The control software 40 is stored in the storage 15 in a form of an execution file (binary data). Further, the control software 40 includes a plurality of Application Programming Interfaces (APIs) and each API includes one or more pieces of internal data processing. That is, the control software 40 includes a plurality of pieces of internal data processing.

The programs that implement the functions of the simulation execution unit 20, the OS 30, and the control software 40 are loaded from the storage 15 into the memory 12. Then, the processor 11 executes the programs, the OS 30, and the control software 40.

Further, the storage 15 stores a classification list to be used by the simulation execution unit 20 to classify an API.

In the memory 12, an area is reserved for storing analysis data generated by the simulation execution unit 20 by executing the control software 40.

The display device 13 displays depiction data in which the analysis data is depicted as an execution result of the control software 40.

The input device 14 receives an instruction from a user of the data processing apparatus 10. The input device 14, for example, receives from the user of the data processing apparatus 10, an instruction to start a simulation.

[Functional Configuration Example]

Figure 2:
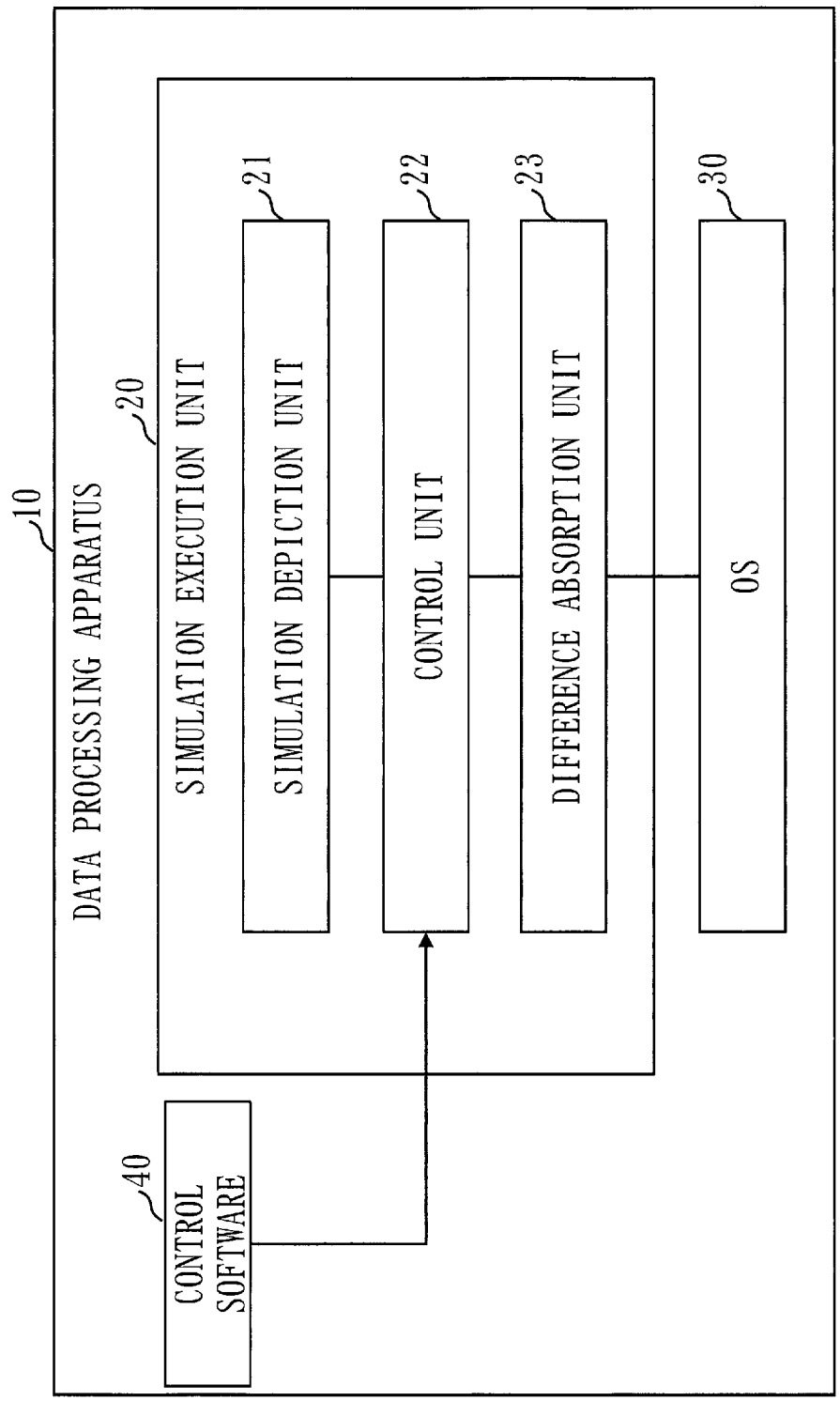
FIG. 2 is a diagram illustrating a functional configuration example of the data processing apparatus according to the first embodiment.

FIG. 2 is a functional configuration example of the data processing apparatus 10 according to the preset embodiment.

A simulation depiction unit 21 depicts a behavior of the machine tool to be simulated by executing the control software 40 and outputs the depiction data to the display device 13.

A control unit 22 acquires the control software 40 from the storage 15 and carries out a control which enables a difference absorption unit 23 to execute the control software 40.

The difference absorption unit 23 simulates the operation of the machine tool by executing at least one of the plurality of pieces of internal data processing of the control software 40. At a time of executing the control software 40, the difference absorption unit 23 absorbs the difference between the execution environment of the CNC device and the execution environment of the data processing apparatus 10.

The OS 30 is an OS that runs on the data processing apparatus 10.

[Internal Configuration Example of the Difference Absorption Unit 23]

Figure 3:
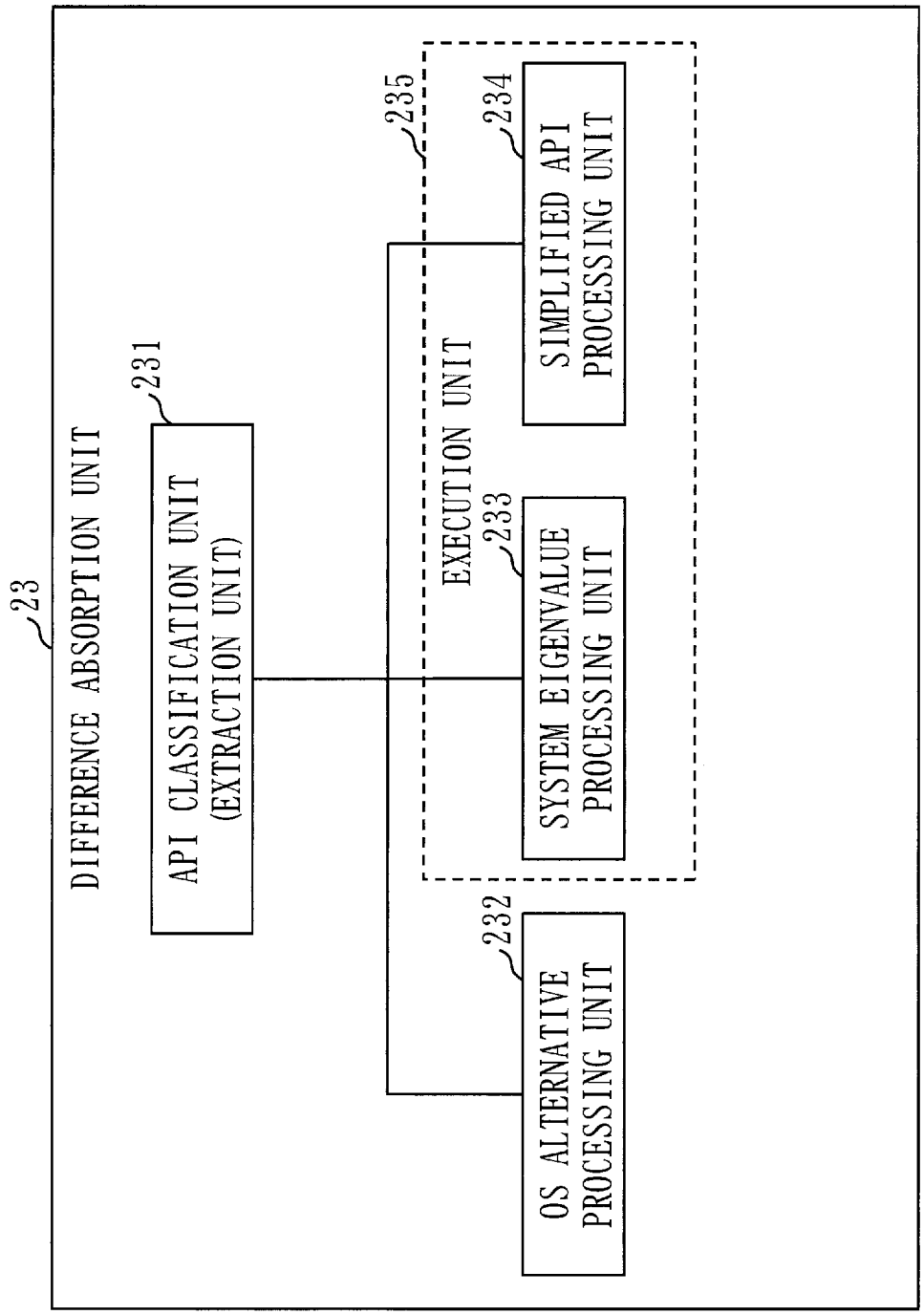
FIG. 3 is a diagram illustrating an internal configuration example of a difference absorption unit according to the first embodiment.

FIG. 3 illustrates an internal configuration example of the difference absorption unit 23.

An API classification unit 231 analyses API names of the OS processing and the hardware processing. The API classification unit 231 identifies a category of the API, based on an API name, and classifies the API into one of a plurality of categories.

For example, the API classification unit 231 classifies a plurality of APIs into one of a first category, a second category, and a third category. In the following, the API classified into the first category is referred to as a first API. Further, the API classified into the second category is referred to as a second API. Further, the API classified into the third category is referred to as a third API.

In a case where the OS 30 manages the same API as an API executed by the OS of the CNC device, the API classification unit 231 identifies the same API, as the first API. Internal data processing included in the first API cannot be omitted from execution.

The second API and the third API are APIs that include omittable internal data processing. The omittable internal data processing is internal data processing that is required to be executed when the CNC device executes the control software 40, but is omittable from the execution when the data processing apparatus 10 executes the control software 40, due to the difference in the execution environment between the CNC device and the data processing apparatus 10.

The omittable internal data processing included in the second API is intrinsic internal data processing to the CNC device, which has been concluded to unexceptionally end erroneously or successfully when executed by the data processing apparatus 10.

Further, the omittable internal data processing included in the third API is internal data processing that can be executed by either the CNC device or the data processing apparatus 10, but can be omitted from the execution when the data processing apparatus 10 executes the control software 40.

The API classification unit 231 is equivalent to an extraction unit. Further, a process performed by the API classification unit 231 is equivalent to an extraction process.

An OS alternative processing unit 232 executes the first API.

A system eigenvalue processing unit 233 executes the second API.

When executing the second API, the system eigenvalue processing unit 233 omits the execution of the omittable internal data processing included in the second API.

A simplified API processing unit 234 processes the third API.

When executing the third API, the simplified API processing unit 234 omits the execution of the omittable internal data processing included in the third API.

The omittable internal data processing is data processing that does not affect simulation accuracy even if the execution is omitted. Therefore, when executing the second API, the system eigenvalue processing unit 233 omits the execution of the omittable internal data processing. Further, when executing the third API, the simplified API processing unit 234 omits the execution of the omittable internal data processing.

The omittable internal data processing is, for example, processing that issues an instruction to the amplifier and controls a motor so as to physically move the machine tool. The CNC device interprets the control software 40, issues an instruction to the amplifier and operates the motor to move the machine tool. In the simulation on the data processing apparatus 10, it is sufficient that the simulation depiction unit 21 can generate a depiction that expresses the fact that the instruction has been issued to the amplifier and the machine tool is moving by the motor. In this way, a physical movement which is generated when the CNC device controls the machine tool, is unnecessary in the simulation. Hence, it is possible to omit the internal data processing such as outputting the instruction to the amplifier.

The system eigenvalue processing unit 233 and the simplified API processing unit 234 are collectively referred to as an execution unit 235. A process performed by the execution unit 235 is equivalent to an execution process.

Description of Operation

Overview of Operation

Figure 4:
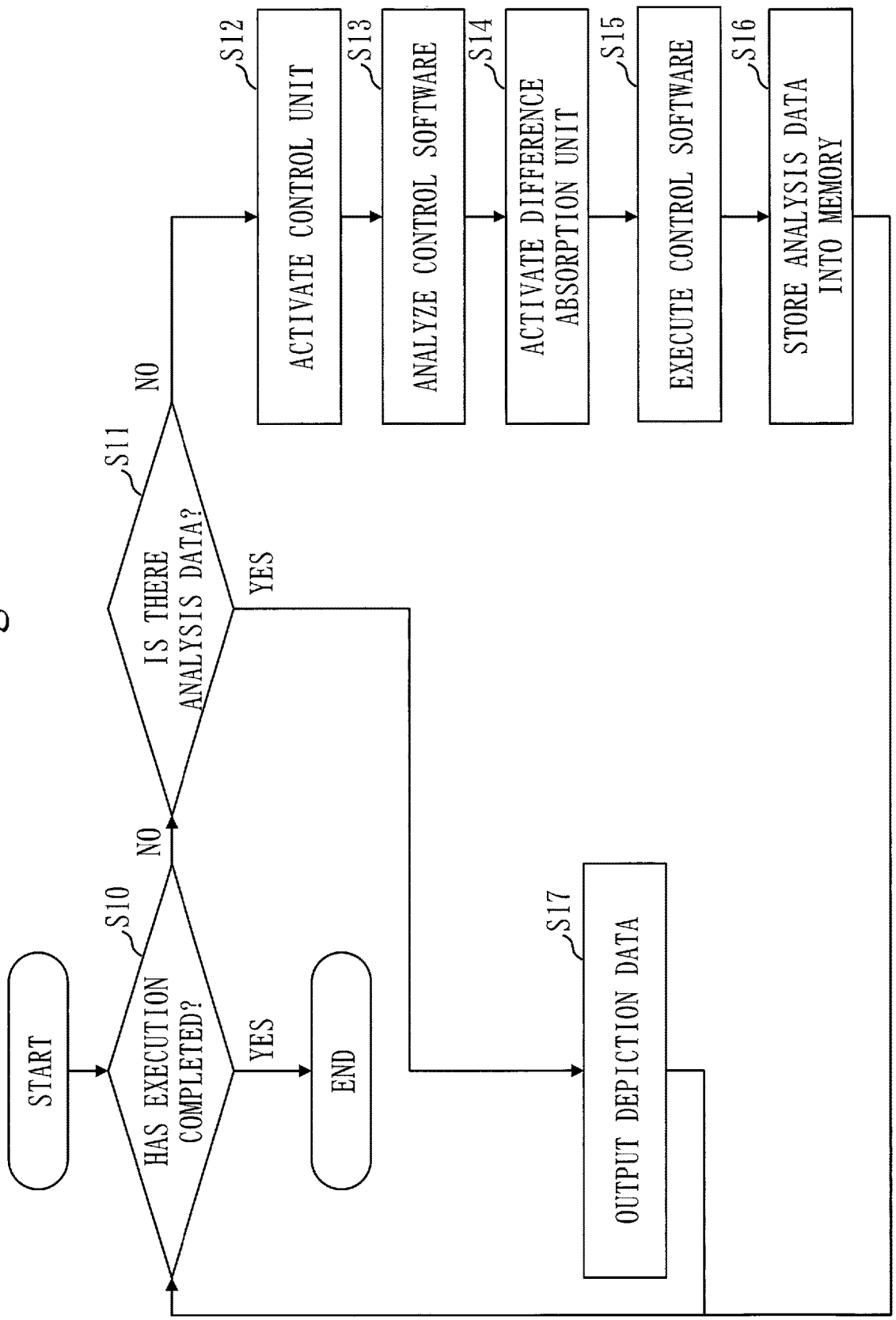
FIG. 4 is a flowchart illustrating an overview of operation of a simulation execution unit according to the first embodiment.

FIG. 4 is a flowchart illustrating an outline of operation of the simulation execution unit 20 according to the present embodiment.

When the user instructs the input device 14 to start the simulation, the simulation depiction unit 21 starts the operation.

When the user instructs the start of the simulation, the simulation depiction unit 21 determines in step S10, whether or not the execution of the control software 40 has been completed.

When all analysis data of the control software 40 in the memory 12 has been processed, the simulation depiction unit 21 determines that the execution of the control software 40 has been completed.

When the execution of the control software 40 has been completed (YES in step S10), the simulation depiction unit 21 ends the process.

On the other hand, when the execution of the control software 40 has not been completed (NO in step S10), the process proceeds to step S11.

In step S11, the simulation depiction unit 21 determines whether or not there is the analysis data of the control software 40 in the memory 12.

When there is the analysis data in the memory 12 (YES in step S11), the process proceeds to step S17. On the other hand, when there is no analysis data in the memory 12 (NO in step S11), the process proceeds to step S12.

In step S12, the simulation depiction unit 21 activates the control unit 22.

Next, in step S13, the control unit 22 analyzes the control software 40.

Then, the control unit 22 activates the difference absorption unit 23 in step S14, as a result of analyzing the control software 40.

Next, in step S15, the difference absorption unit 23 executes the control software 40.

Then, in step S16, the difference absorption unit 23 stores into the memory 12, the analysis data indicating an execution result of step S14.

In step S17, the simulation depiction unit 21 generates the depiction data corresponding to the analysis data stored in the memory 12 and outputs the depiction data to the display device 13.

[Operation Example of the API Classification Unit 231]

Figure 5:
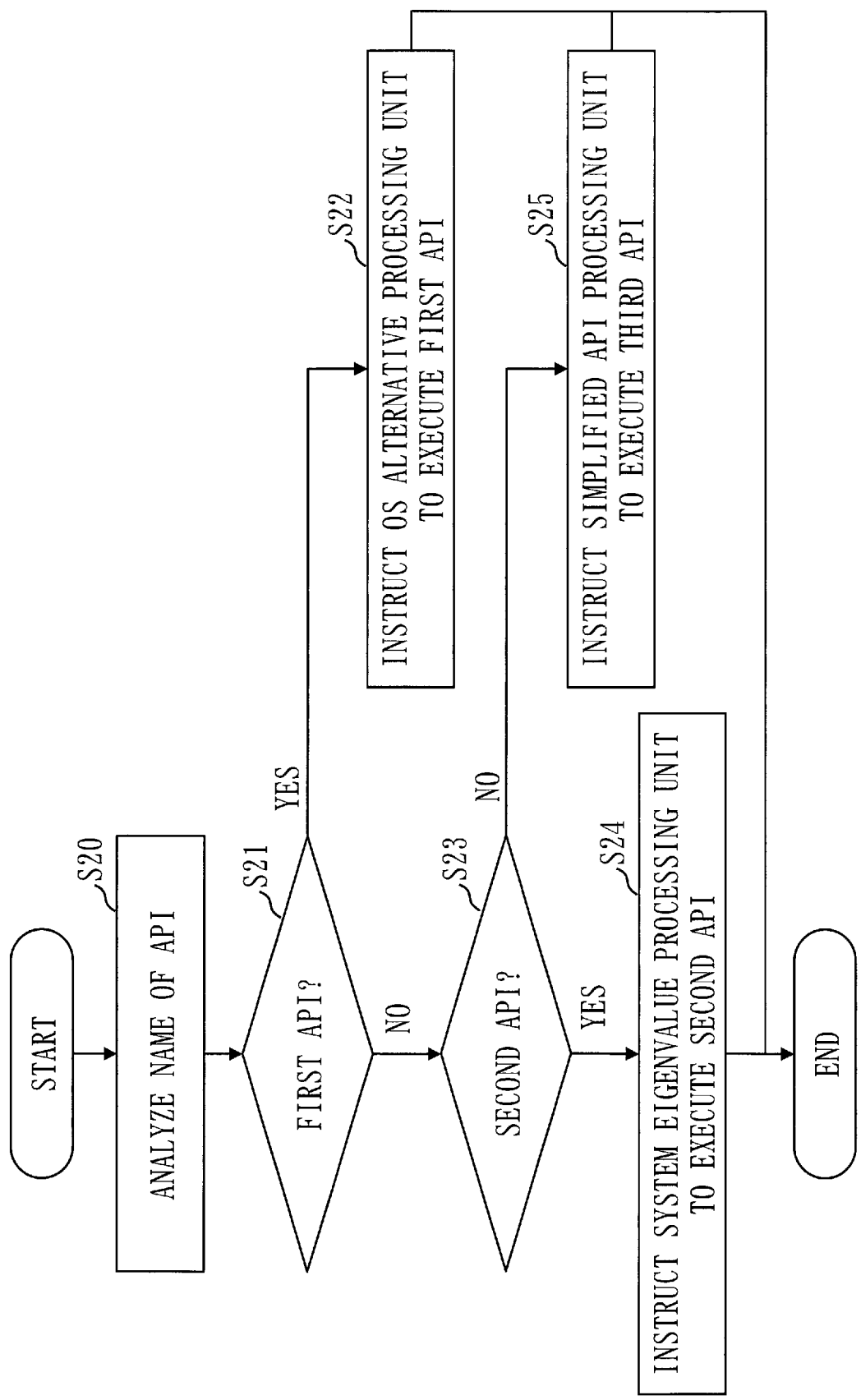
FIG. 5 is a flowchart illustrating an operation example of an API classification unit according to the first embodiment.

FIG. 5 is a flowchart illustrating an operation example of the API classification unit 231 of the difference absorption unit 23.

Figure 6:
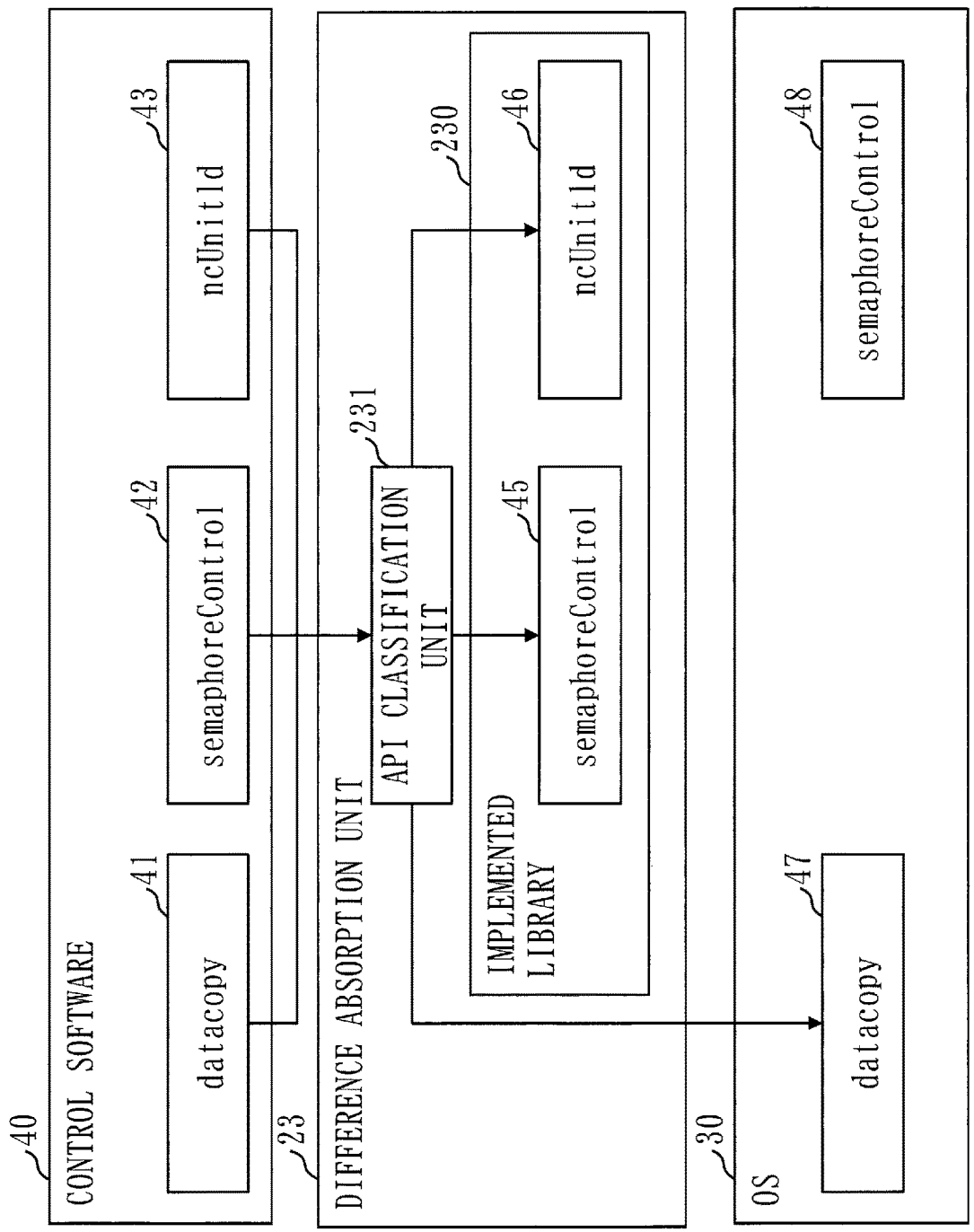
FIG. 6 is a diagram illustrating an operation example of an API and the API classification unit included in control software according to the first embodiment.

Further, FIG. 6 illustrates an example of the APIs included in the control software 40 and an operation example of the API classification unit 231 for each API.

In the present embodiment, it is assumed that the API is defined by the following rules.

(1) An API whose name consists only of lowercase alphanumeric characters is the first API.

(2) An API whose name includes elements other than the lowercase alphanumeric characters is the second API or the third API. The second API or the third API includes a plurality of words in the name. A first word consists only of lowercase alphanumeric characters and a first character of a subsequent word is an uppercase alphabetic character.

(3) The first word of the third API is listed in the classification list.

The above "lowercase alphanumeric characters" means lowercase alphabetic characters only or lowercase alphabetic characters and numbers only.

Figure 7:
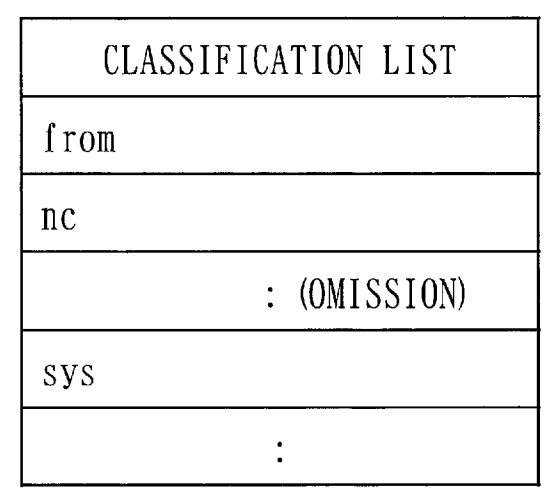

FIG. 7 illustrates an example of the classification list.

The first word of the name of the third API is listed in the classification list.

In FIG. 5, in step S20, the API classification unit 231 analyzes the name of the API to be called, which is included in the control software 40.

Here, it is assumed that the API classification unit 231 analyzes the names of three APIs which are datacopy 41, semaphoreControl 42, and ncUnitId 43 illustrated in FIG. 6.

datacopy 41 is the API that copies data in a specific area of the memory 12 to another area of the memory 12.

semaphoreControl 42 is the API that controls concurrent execution of a plurality of tasks with using a semaphore, grants an execution permission only to a task with high execution priority, and causes other tasks to wait for execution.

ncUnitId 43 is the API that reads an identification number uniquely assigned to the CNC device and returns the read identification number.

As a result of the analysis in step S20, when the API subject to analysis is the first API (YES in step S21), that is, when the name of the API subject to analysis consists only of lowercase alphanumeric characters, the process proceeds to step S22. On the other hand, when the API subject to analysis is not the first API (NO in step S21), that is, when the elements other than the lowercase alphanumeric characters are included in the name of the API, the process proceeds to step S23.

When the API classification unit 231 has analyzed datacopy 41 in FIG. 6, the process proceeds to step S22. On the other hand, the API classification unit 231 has analyzed semaphoreControl 42 and ncUnitId 43 in FIG. 6, the process proceeds to S23.

In step S22, the API classification unit 231 instructs the OS alternative processing unit 232 to execute the first API which is managed by the OS 30. In the example of FIG. 6, the API classification unit 231 instructs the OS alternative processing unit 232 to execute datacopy 47 which is the same API as datacopy 41, which is managed by the OS 30.

In step S23, the API classification unit 231 determines whether or not the API subject to analysis corresponds to the second API.

Specifically, the API classification unit 231 refers to the classification list stored in the storage 15 and determines whether or not the API subject to analysis corresponds to the second API. As described above, the first word of the name of the third API is listed in the classification list. Therefore, when the first word of the name of the API subject to analysis is not included in the classification list, the API subject to analysis corresponds to the second API.

When the API subject to analysis is the second API (YES in step S23), the process proceeds to step S24.

On the other hand, when the API subject to analysis is not the second API (NO in step S23), that is, when the API subject to analysis is the third API, the process proceeds to step S25.

In the classification list in FIG. 7, "nc" is listed. Therefore, the API classification unit 231 determines that ncUnitId 43 whose first word is "nc" is the third API, according to the classification list. On the other hand, "semaphore" is not listed in the classification list. Therefore, the API classification unit 231 determines that semaphoreControl 42 is the second API.

Therefore, when the API classification unit 231 has analyzed semaphoreControl 42, the process proceeds to step S24. On the other hand, when the API classification unit 231 has analyzed ncUnitId 43, the process proceeds to step S25.

In step S24, the API classification unit 231 instructs the system eigenvalue processing unit 233 to execute the second API which is managed by an implemented library. In the example of FIG. 6, the API classification unit 231 instructs the system eigenvalue processing unit 233 to execute semaphoreControl 45 which is the API corresponding to semaphoreControl 42, which is managed by an implemented library 230 of the difference absorption unit 23.

In the OS 30, there is semaphoreControl 48 which is the API corresponding to semaphoreControl 42, but the API classification unit 231 instructs the system eigenvalue processing unit 233 to execute semaphoreControl 45.

In step S25, the API classification unit 231 instructs the simplified API processing unit 234 to execute the third API which is managed by the implemented library. In the example of FIG. 6, the API classification unit 231 instructs the simplified API processing unit 234 to execute ncUnitId 46 which is the API corresponding to ncUnitId 43, which is managed by the implemented library 230 of the difference absorption unit 23.

The API classification unit 231 performs the above processes to all APIs included in the control software 40.

[Operation Example of the OS Alternative Processing Unit 232, the System Eigenvalue Processing Unit 233, and the Simplified API Processing Unit 234]

Figure 8:
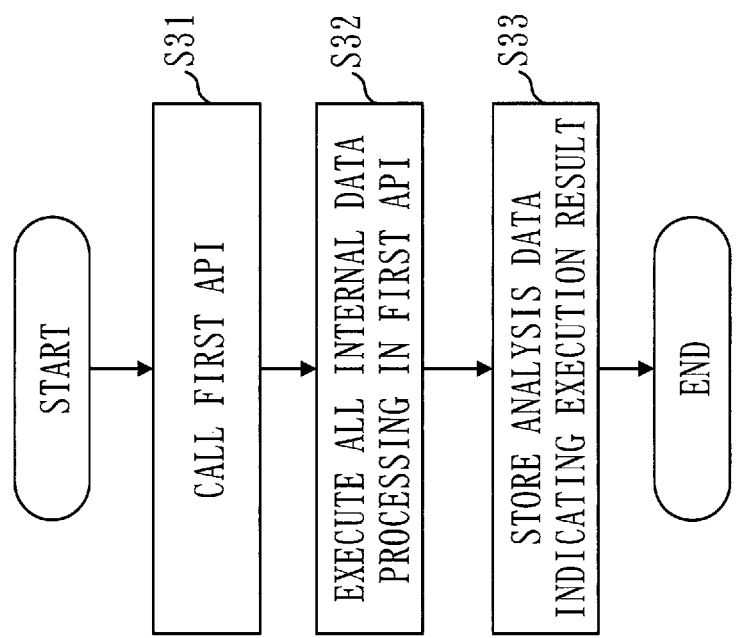
FIG. 8 is a flowchart illustrating an operation example of an OS alternative processing unit according to the first embodiment.

FIG. 8 is a flowchart illustrating an operation example of the OS alternative processing unit 232 when the execution of the first API has been instructed by the API classification unit 231 in step S22 of FIG. 5.

First, in step S31, the OS alternative processing unit 232 calls the first API which is managed by the OS 30.

In the example of FIG. 6, the OS alternative processing unit 232 calls datacopy 47.

Next, in step S32, the OS alternative processing unit 232 executes all internal data processing included in the called first API.

Finally, in step S33, the OS alternative processing unit 232 generates analysis data indicating an execution result of step S32 and stores the generated analysis data into the memory 12.

Figure 9:
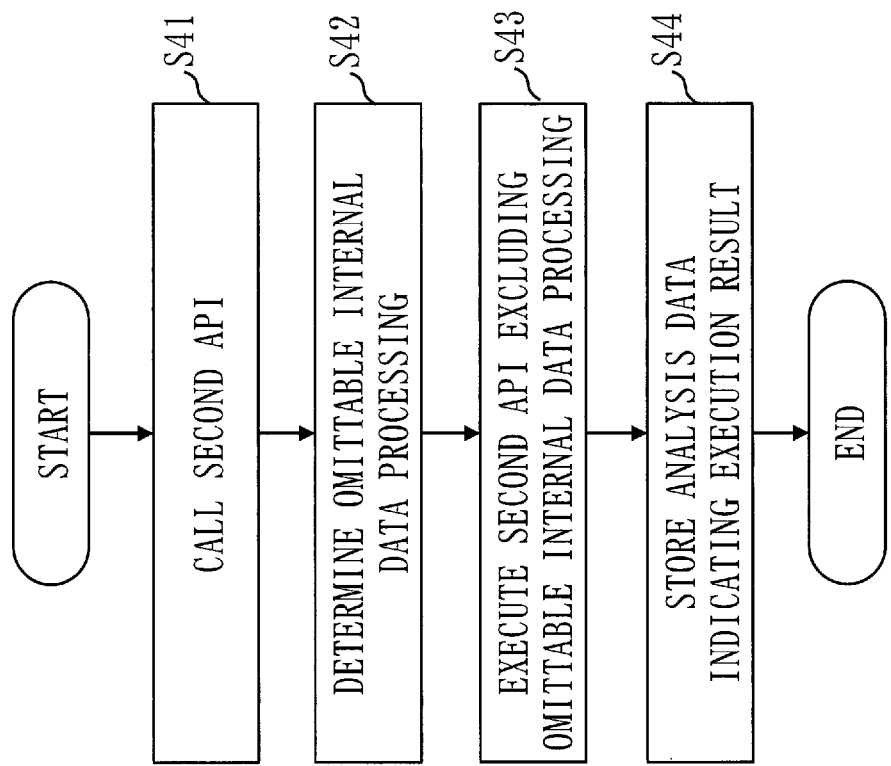
FIG. 9 is a flowchart illustrating an operation example of a system eigenvalue processing unit according to the first embodiment.

FIG. 9 is a flowchart illustrating an operation example of the system eigenvalue processing unit 233 when the execution of the second API has been instructed by the API classification unit 231 in step S24 of FIG. 5.

First, in step S41, the system eigenvalue processing unit 233 calls the second API which is managed by the implemented library 230.

In the example of FIG. 6, the system eigenvalue processing unit 233 calls semaphoreControl 45.

Next, in step S42, the system eigenvalue processing unit 233 identifies the omittable internal data processing among a plurality of pieces of internal data processing included in the called second API.

Next, in step S43, the system eigenvalue processing unit 233 executes the internal data processing included in the second API, excluding the omittable internal data processing identified in step S42.

Finally, in step S44, the system eigenvalue processing unit 233 generates analysis data indicating an execution result of step S43 and stores the generated analysis data into the memory 12.

Figure 10:
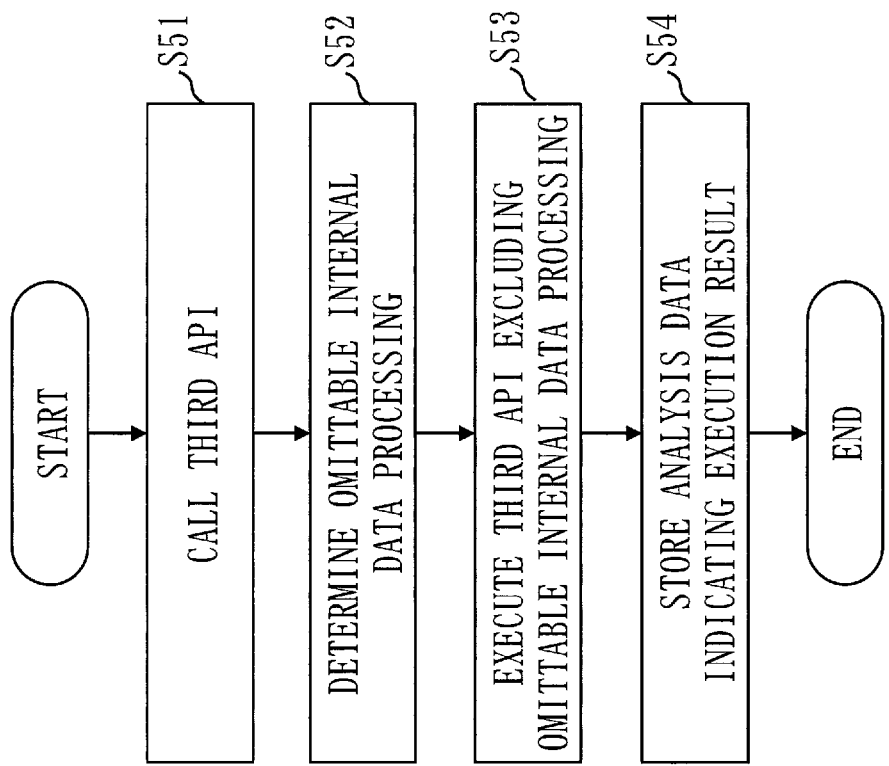
FIG. 10 is a flowchart illustrating an operation example of a simplified API processing unit according to the first embodiment.

FIG. 10 is a flowchart illustrating an operation example of the simplified API processing unit 234 when the execution of the third API has been instructed by the API classification unit 231 in step S25 of FIG. 5.

First, in step S51, the simplified API processing unit 234 calls the third API which is managed by the implemented library 230.

In the example of FIG. 6, the simplified API processing unit 234 calls ncUnitId 46.

Next, in step S52, the simplified API processing unit 234 identifies the omittable internal data processing among a plurality of pieces of internal data processing included in the called third API.

Next, in step S53, the simplified API processing unit 234 executes the internal data processing included in the third API, excluding the omittable internal data processing identified in step S52.

Finally, in step S54, the simplified API processing unit 234 generates analysis data indicating an execution result of step S53 and stores the generated analysis data into the memory 12.

Figure 11:
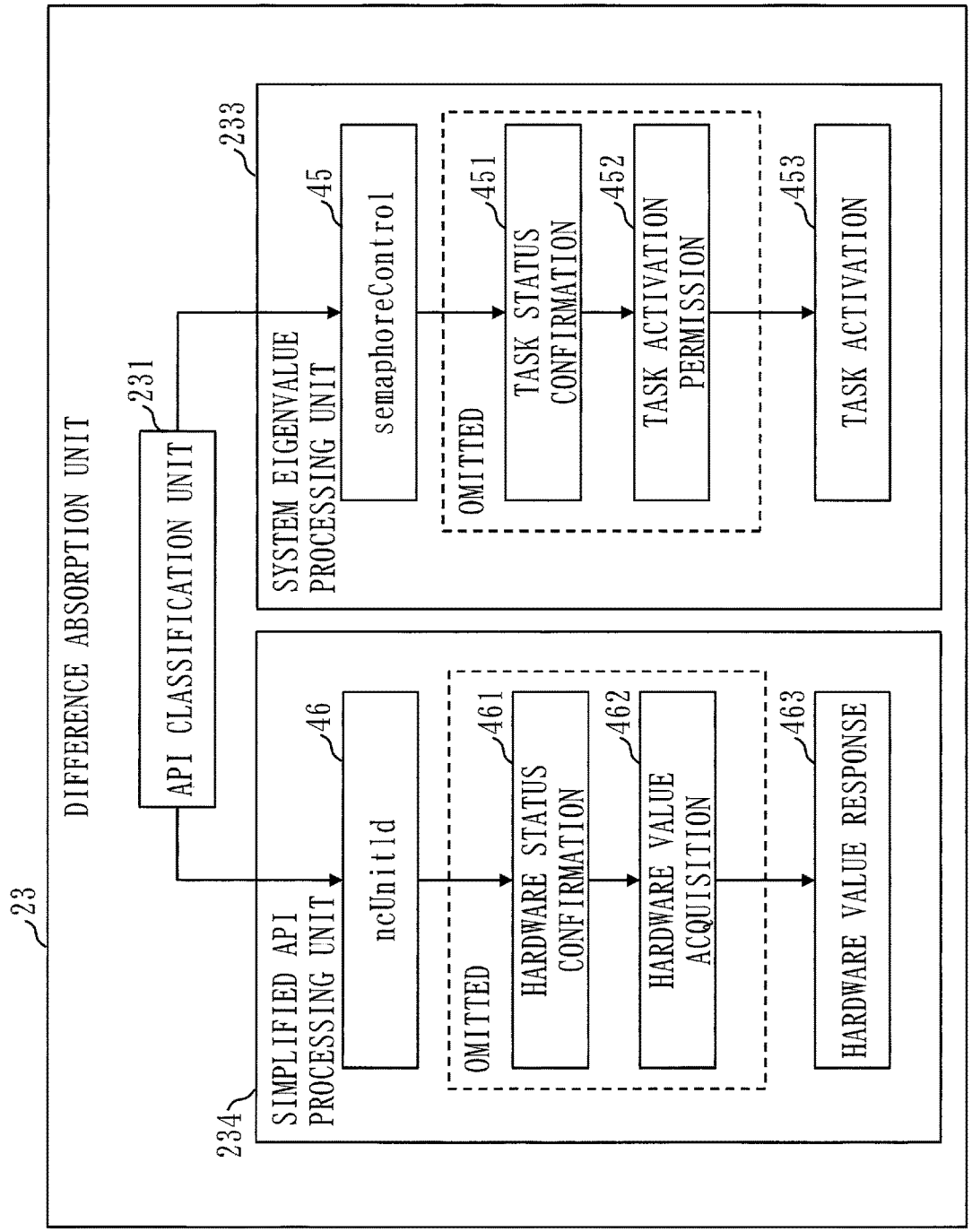
FIG. 11 is a diagram illustrating an operation example of the system eigenvalue processing unit and the simplified API processing unit according to the first embodiment.

FIG. 11 is a diagram specifically describing the operation example of the system eigenvalue processing unit 233 illustrated in FIG. 9 and the operation example of the simplified API processing unit 234 illustrated in FIG. 10.

The system eigenvalue processing unit 233 identifies internal data processing that can be omitted at a time of executing semaphoreControl 45.

The control software 40 runs on the real-time OS in the CNC device. In order to guarantee real-time property of a process of the control software 40, semaphoreControl 42 in the control software 40 includes three pieces of internal data processing which are a task status confirmation, a task activation permission, and a task activation. As illustrated in FIG. 11, semaphoreControl 45 corresponding to semaphoreControl 42 includes three pieces of internal data processing which are a task status confirmation 451, a task activation permission 452, and a task activation 453.

However, it is not required to guarantee the real-time property in the simulation on data processing apparatus 10. Therefore, the system eigenvalue processing unit 233 determines that the task status confirmation 451 and the task activation permission 452, which are the internal data processing for guaranteeing the real-time property, can be omitted.

As a result, the system eigenvalue processing unit 233 executes only the task activation 453.

The simplified API processing unit 234 identifies internal data processing that can be omitted at a time of executing ncUnitId 46.

When the control software 40 is executed on the CNC device, confirming a hardware status, acquiring a hardware value indicating the hardware status, and responding the acquired hardware value, are performed as operation of ncUnitId 43. In this way, ncUnitId 43 in the control software 40 includes three pieces of internal data processing which are a hardware status confirmation, a hardware value acquisition, and a hardware value response. As illustrated in FIG. 11, ncUnitId 46 corresponding to ncUnitId 43 includes three pieces of internal data processing which are a hardware status confirmation 461, a hardware value acquisition 462, and a hardware value response 463.

However, there is no hardware subject to the hardware status confirmation 461 and the hardware value acquisition 462, in the simulation on the data processing apparatus 10. Further, even if there is such hardware, it is not required to actually confirm a status of the hardware in the simulation and it is not required to acquire a hardware value from the hardware. Therefore, the simplified API processing unit 234 determines that the hardware status confirmation 461 and the hardware value acquisition 462 can be omitted.

As a result, the simplified API processing unit 234 executes only the hardware value response 463

Description of Effect of Embodiment

As described above, according to the present embodiment, it is possible to reduce an overhead caused from a difference in an execution environment. Then, it is possible to improve an execution speed of a simulation by reducing the overhead.

Further, in the present embodiment, the difference absorption unit 23 alternatively performs processing of hardware and an OS mounted in the CNC device. Therefore, according to the present embodiment, it is possible to migrate the control software 40 to a general-purpose PC without modifying a source code which is a base of the control software 40 in the CNC device.

Further, the difference absorption unit 23 has a library of appropriately simplified processing of the hardware and the OS mounted in the CNC device, and can maintain the same precision in processing as that of a conventional method for emulating the CNC device and can operate at a higher speed than that of the conventional method.

*Supplementary Description of Hardware Configuration*

Finally, a supplementary description of the hardware configuration of the data processing apparatus 10 will be given.

The processor 11 illustrated in FIG. 1 is an Integrated Circuit (IC) that performs processing.

The processor 11 is a Central Processing Unit (CPU), a Digital Signal Processor (DSP), or the like.

The memory 12 illustrated in FIG. 1 is a Random Access Memory (RAM).

The storage device 15 illustrated in FIG. 1 is a Read Only Memory (ROM), a flash memory, an HDD (Hard Disk Drive), or the like.

The display device 13 illustrated in FIG. 1 is a display such as a Liquid Crystal Display (LCD).

The input device 14 illustrated in FIG. 1 is a keyboard, a mouse, or the like.

At least one of information, data, a signal value, and a variable value that indicate results of processes of the simulation depiction unit 21, the control unit 22, and the difference absorption unit 23 is stored in at least one of the memory 12, the storage 15, and a register and a cache memory in the processor 11.

Further, the programs that implement functions of the simulation depiction unit 21, the control unit 22, and the difference absorption unit 23 may be stored in a portable recording medium such as a magnetic disk, a flexible disk, an optical disc, a compact disc, a Blu-ray (registered trademark) disc, or a DVD. Then, the portable recording medium storing the programs that implement the functions of the simulation depiction unit 21, the control unit 22, and the difference absorption unit 23 may be distributed.

Further, the "unit" of each of the simulation depiction unit 21, the control unit 22, and the difference absorption unit 23 may be read as a "circuit", "step", "procedure", "process", or "circuitry".

Further, the data processing apparatus 10 may be implemented by a processing circuit. The processing circuit is, for example, a logic Integrated Circuit (IC), a Gate Array (GA), an Application Specific Integrated Circuit (ASIC), or a Field-Programmable Gate Array (FPGA).

In this case, each of the simulation depiction unit 21, the control unit 22, and the difference absorption unit 23 is implemented as a part of the processing circuit.

Note that, in the present specification, a superordinate concept of the processor and the processing circuit is referred to as "processing circuitry".

That is, each of the processor and the processing circuit is a specific example of the "processing circuitry".

REFERENCE SIGNS LIST

10: data processing apparatus; 11: processor; 12: memory; 13: display device; 14: input device; 15: storage; 20: simulation execution unit; 21: simulation depiction unit; 22: control unit; 23: difference absorption unit; 30: OS; 40: control software; 230: implemented library; 231: API classification unit; 232: OS alternative processing unit; 233: system eigenvalue processing unit; 234: simplified API processing unit; 235: execution unit

The invention claimed is:

1. A data processing apparatus whose execution environment for data processing differs from that of an outside data processing device which is a data processing device outside that executes a plurality of Application Programming Interfaces (APIs), each of which includes one or more pieces of internal data processing, and that executes the plurality of APIs, the data processing apparatus comprising:
   processing circuitry:
   to analyze characters used in each name of the plurality of APIs and to extract from among the plurality of APIs, an extracted API including omittable internal data processing that is required to be executed by the outside data processing device, but is omittable from the execution by the data processing apparatus, due to the difference in the execution environment between the outside data processing device and the data processing apparatus; and
   to execute the extracted API while omitting the execution of the omittable internal data processing included in the extracted API, wherein
   the omittable internal data processing is data processing that does not affect an accuracy of simulation of the outside data processing device when the data processing apparatus omits the execution of the omittable internal data processing.

2. The data processing apparatus according to claim 1, wherein
   the processing circuitry extracts as the extracted API, an API other than a first API which is an API that uses only lowercase alphanumeric characters in its name.

3. The data processing apparatus according to claim 2, wherein
   the processing circuitry classifies the extracted API into one of
   a second API which is an API that includes as the omittable internal data processing, internal data processing which has been concluded to unexceptionally end erroneously or successfully when executed by the data processing apparatus and
   a third API which is an API that includes as the omittable internal data processing, internal data processing that can be executed by either the outside data processing device or the data processing apparatus, but is omittable from the execution by the data processing apparatus, and
   the processing circuitry comprises second processing circuitry that executes the second API and third processing circuitry that executes the third API,
   causes the second processing circuitry to execute the second API when the API extracted by the processing circuitry is the second API, and
   causes the third processing circuitry to execute the third API when the API extracted by the processing circuitry is the third API.

4. The data processing apparatus according to claim 3, wherein
   the processing circuitry classifies the extracted API into the third API when the extracted API includes a specific word, and classifies the extracted API into the second API when the extracted API does not include the specific word.

5. A data processing method for executing a plurality of Application Programming Interfaces (APIs) by a computer whose execution environment for data processing differs from that of an outside data processing device which is a data processing device outside that executes the plurality of APIs, each of which includes one or more pieces of internal data processing, the data processing method comprising:
   analyzing characters used in each name of the plurality of APIs and extracting, from among the plurality of APIs, an extracted API including omittable internal data processing that is required to be executed by the outside data processing device, but is omittable from the execution by the computer, due to the difference in the execution environment between the outside data processing device and the computer; and
   executing the extracted API while omitting the execution of the extracted omittable internal data processing included in the extracted API, wherein
   the omittable internal data processing is data processing that does not affect an accuracy of simulation of the outside data processing device when the computer omits the execution of the omittable internal data processing.

6. A non-transitory computer readable medium storing a data processing program for causing a computer whose execution environment for data processing differs from that of an outside data processing device which is a data processing device outside that executes a plurality of Application Programming Interfaces (APIs), each of which includes one or more pieces of internal data processing, to execute the plurality of APIs, the data processing program for causing the computer to execute:
   an extraction process to analyze characters used in each name of the plurality of APIs and to extract from among the plurality of APIs, an extracted API including omittable internal data processing that is required to be executed by the outside data processing device-, but is omittable from the execution by the computer, due to the difference in the execution environment between the outside data processing device and the computer; and an execution process to execute the extracted API while omitting the execution of the omittable internal data processing included in the API extracted by the extraction process, wherein the omittable internal data processing is data processing that does not affect an accuracy of simulation of the outside data processing device when the computer omits the execution of the omittable internal data processing.

\* \* \* \* \*